(12) United States Patent
Dalfovo et al.

(10) Patent No.: US 12,398,807 B2
(45) Date of Patent: Aug. 26, 2025

(54) DOUBLE SAFETY VALVE

(71) Applicant: ESA S.P.A., Curno (IT)

(72) Inventors: Milco Dalfovo, Villa di Serio (IT); Simone Losa, Calolziocorte (IT); Andrea Baio, Reviolo (IT)

(73) Assignee: ESA S.P.A., Curno (IT)

( * ) Notice: Subject to any disclaimer, the term of this patent is extended or adjusted under 35 U.S.C. 154(b) by 0 days.

(21) Appl. No.: 18/696,470

(22) PCT Filed: Sep. 23, 2022

(86) PCT No.: PCT/IB2022/059024
§ 371 (c)(1),
(2) Date: Mar. 28, 2024

(87) PCT Pub. No.: WO2023/052919
PCT Pub. Date: Apr. 6, 2023

(65) Prior Publication Data
US 2025/0003502 A1    Jan. 2, 2025

(30) Foreign Application Priority Data
Sep. 29, 2021 (IT) .......... 102021000024917

(51) Int. Cl.
*F16K 1/44* (2006.01)
*F16K 27/02* (2006.01)
*F16K 31/06* (2006.01)

(52) U.S. Cl.
CPC ............ *F16K 1/443* (2013.01); *F16K 27/029* (2013.01); *F16K 31/0651* (2013.01)

(58) Field of Classification Search
CPC .... F16K 1/443; F16K 27/029; F16K 31/0655; F16K 31/0693
See application file for complete search history.

(56) References Cited

U.S. PATENT DOCUMENTS

| | | | |
|---|---|---|---|
| 3,333,602 A | 8/1967 | Erickson | |
| 3,344,807 A * | 10/1967 | Lehrer | F16K 51/02 137/614.19 |
| 4,637,619 A | 1/1987 | Stansberry | |

(Continued)

FOREIGN PATENT DOCUMENTS

| | | |
|---|---|---|
| EP | 0825371 A1 | 2/1998 |
| EP | 1798456 A1 | 6/2007 |

(Continued)

*Primary Examiner* — Eric Keasel
(74) *Attorney, Agent, or Firm* — Andrew D. Dorisio; Dickinson Wright PLLC

(57) ABSTRACT

A double safety valve includes a valve body having an inlet opening for a pressurized fluid and an outlet opening, both communicating with connected chambers within the valve body which connection may be shut-off by shutters activated by corresponding electric coils. The shutters are placed along a common longitudinal axis opposite to each other, and activated independently for shutting off the connections between the chambers and the openings in favour of the fluid flow, that is to say pressurized fluid acting on the shutters so that the shut-off is maintained when the shutters are deactivated. Each shutter is kept in a shut-off position also by the fluid coming from the inlet openings acting on a first end of the shutter inside the corresponding electric coil.

5 Claims, 6 Drawing Sheets

(56) References Cited

U.S. PATENT DOCUMENTS

| | | | | |
|---|---|---|---|---|
| 6,216,735 B1 * | 4/2001 | Hirata | ................. | F16K 11/0743 |
| | | | | 137/625.43 |
| 11,125,348 B2 * | 9/2021 | Groza | ................... | F16K 39/022 |
| 2020/0116270 A1 | 4/2020 | Groza | | |

FOREIGN PATENT DOCUMENTS

| | | | |
|---|---|---|---|
| EP | 2119947 | A2 | 11/2009 |
| JP | S6131778 | A | 2/1986 |
| WO | 2007098789 | A1 | 9/2007 |

* cited by examiner

DOUBLE SAFETY VALVE

TECHNICAL FIELD

The present invention relates to a double safety valve, according to the preamble of the main claim.

BACKGROUND

A valve according to the invention is adapted to be placed on a duct where a pressurized fluid circulates; the valve is adapted to safely interrupt the flow of that fluid should particular conditions arise downstream of the valve which require the duct on which it is placed to be closed.

Usually, two single safety valves independent of each other are used for the aforementioned purpose. However, a safety valve of the type comprising a double shutter is also known: it includes a valve body having an inlet opening for the fluid (coming from a duct portion upstream of the valve) and an outlet opening for this fluid (towards the duct portion downstream of the valve), directed towards a user. These inlet and outlet openings are connected to each other by means of channels and/or chambers provided inside the valve body and adapted to be intercepted and closed by movable shutters associated with the valve body. The shutters are opposed to each other and are placed with longitudinal axes perpendicular to those of the fluid inlet and outlet openings.

The shutters are preferably operated by means of solenoids present at opposite faces of the valve body and fixed to it, so as to be able to open or close the connection between said channels and/or chambers inside the valve body and to allow the fluid flow, when desired, from the inlet to the outlet opening.

In known solutions, these shutters are connected to each other or operate jointly to shut off or not the pressurized fluid in the valve body. In this solution, the pressurized fluid is usually adapted to operate on the first shutter so as to keep it in a closed position in order to prevent the fluid from passing through the valve body. On the contrary, usually the pressurized fluid acts on the second shutter so as to push it into an open position: this characteristic allows the second shutter to be kept open in the event of an increase in the pressure of the circulating fluid.

A double shutter valve of the type indicated above, while performing a correct safety function aimed at avoiding overpressures in the duct to which it is associated, could, on the contrary, present problems in the event that the solenoids are inactive (for example due to a lack of voltage) and the pressurized fluid should be prevented from passing from the inlet to the outlet opening through the valve body. This is precisely because the two shutters are connected to each other, they operate simultaneously and the second shutter is kept open by the fluid pressure.

Therefore, even if the first shutter closes, the second one can be kept open by the pressurized fluid.

EP1798456 relates to a shut-off valve suitable for use in a gas fired boiler, a gas combustion apparatus or the like.

The valve comprises a valve casing equipped with an inlet and an outlet connected by a passage on which a valve portion acting on a corresponding valve seat is placed.

The valve portion is adapted to shut-off a hole in this seat that connects the inlet and outlet through the passage.

The valve is moved by electromagnetic valve opening means which move a shaft connected to a valve body to open and close the valve seat hole by moving this body.

In FIG. 6, EP1798456 shows a double valve, with two opposite valve bodies.

Each valve body is composed of two portions superimposed one upon the other, the first portion is formed of an elastic material, the second portion is formed of a part of an elastic material (in contact with the first portion) and of a second rigid part. These portions are movable relative to each other when the shaft is moved.

Furthermore, the first portion has a larger diameter in contact with a first valve seat portion, while the second portion has a smaller diameter and is in contact with a second valve seat portion.

The valve opening means is composed of a solenoid having a movable part integral with the respective shaft; the solenoid is outside the valve body, in a cover which is closed, towards the valve body, by a plate regulating the movement of the valve body.

EP2119947 discloses a double safety valve having a housing with an inlet and an outlet. Between the latter are two intermediate (superimposed and coaxial) chambers obtained in an internal part of the housing. Two valve seats spaced from each other on which corresponding valve elements are adapted to be positioned are present at these chambers are. The inlet valve seat has a larger internal diameter than the outlet valve seat.

The valve elements are part of actuators which are spring loaded towards a closed position on the valve seats.

These valve elements and the actuators are independently movable under the action of solenoids acting on movable bodies integral with the valve elements.

According to EP2119947, the intermediate chambers are placed between the two valve seats and are axially connected to each other, the internal diameter of the chamber facing the inlet of the housing 1 being greater than that of the chamber facing the outlet.

The actuators have a pot shape and sealingly move in corresponding cylinders, the bottoms of these actuators defining the valve elements.

The bottoms of the actuators are provided with at least one pressure equalization hole communicating with the inlet and outlet chambers.

US2020/116270 relates to a slam-shut valve with two actuators independently controlled and adapted to close in favour of the fluid (gas) flow passing through the valve.

The actuators are subject to mechanical release mechanisms which close the actuators on corresponding valve seats.

More specifically, each actuator comprises a complex member defined by several parts coupled together. Each complex member comprises a control element movable in a sleeve body under the action of a spring. The control element includes a bypass body having an annular head and a cylindrical body. The head is seated on the control element at one of its second ends.

This is opposite to a first end.

The second end is adapted to close on a corresponding valve seat of the valve body.

The bypass body includes an orifice in which a rod connected to a body coupled to a rod operatively connected to a valve stem operated by the release or trigger mechanism of the relative actuator can be moved.

The control element, the bypass body, the present rods and the body are movable with respect to the valve seat and the sleeve body to control the passage of the fluid in the valve body.

At the same time, the inlet fluid can penetrate into the control element through one or more openings and reach an opening in the annular head.

Furthermore, the first end of the control element is in fluid communication (through the aforementioned opening) with the second end of this element when this element is in a first position with the valve open, while this communication is interrupted when the valve is close.

SUMMARY

The object of the present invention is to provide a double safety valve which offers an improved safety of use with respect to known solutions.

In particular, the object of the present invention is to provide a safety valve of the aforementioned type having a single body but having two shutters which can effectively interrupt the fluid flow from the inlet to the outlet opening if one or both of the solenoids operating the shutters should deactivate, for example due to a power failure. The double valve thus performs the function of two independent coupled single valves.

Another object is to provide a safety valve of the type indicated above which can operate in any spatial position.

A further object is to provide a simple safety valve, easy to move and which can also allow to carry out tightness controls, bypass passage controls or other by shutting off the pressurized fluid between the two shutters.

These and other objects which will be evident to the person skilled in the art are achieved by a safety valve according to the appended independent claim.

BRIEF DESCRIPTION OF THE DRAWINGS

For a better understanding of the present invention, the following drawings are attached purely by way of non-limiting example, in which.

DETAILED DESCRIPTION

Figure 1:
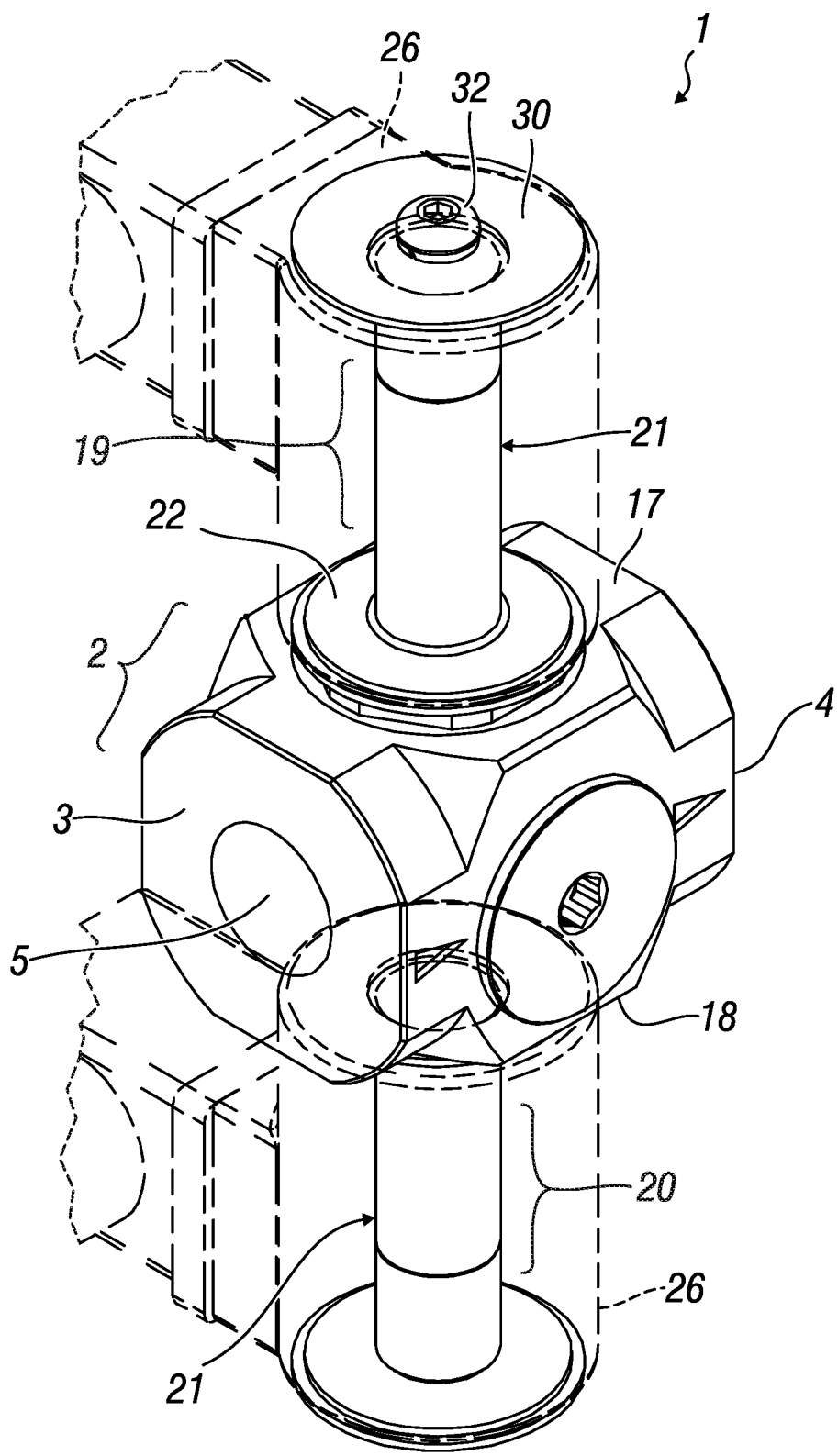
FIG. 1 is a perspective view of a double safety valve according to the invention.
Figure 2:
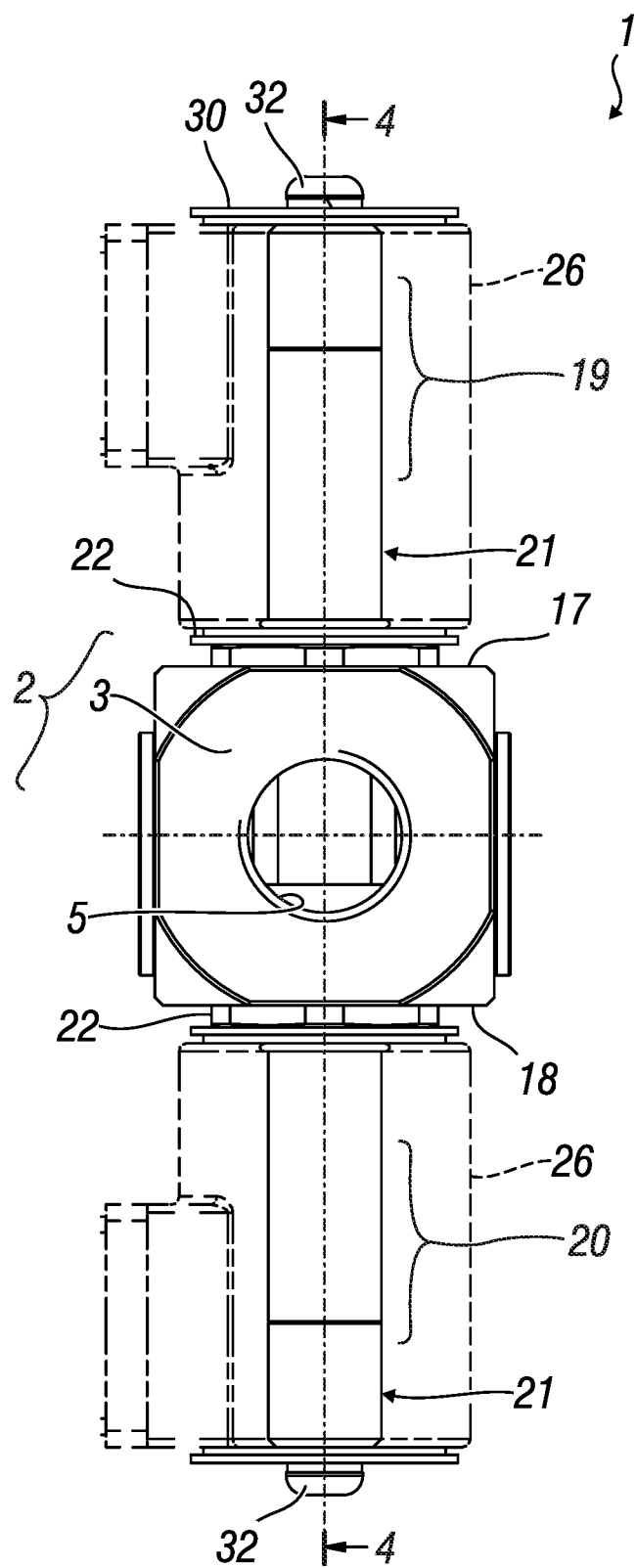
FIG. 2 is a right view of the valve of FIG. 1.
Figure 3:
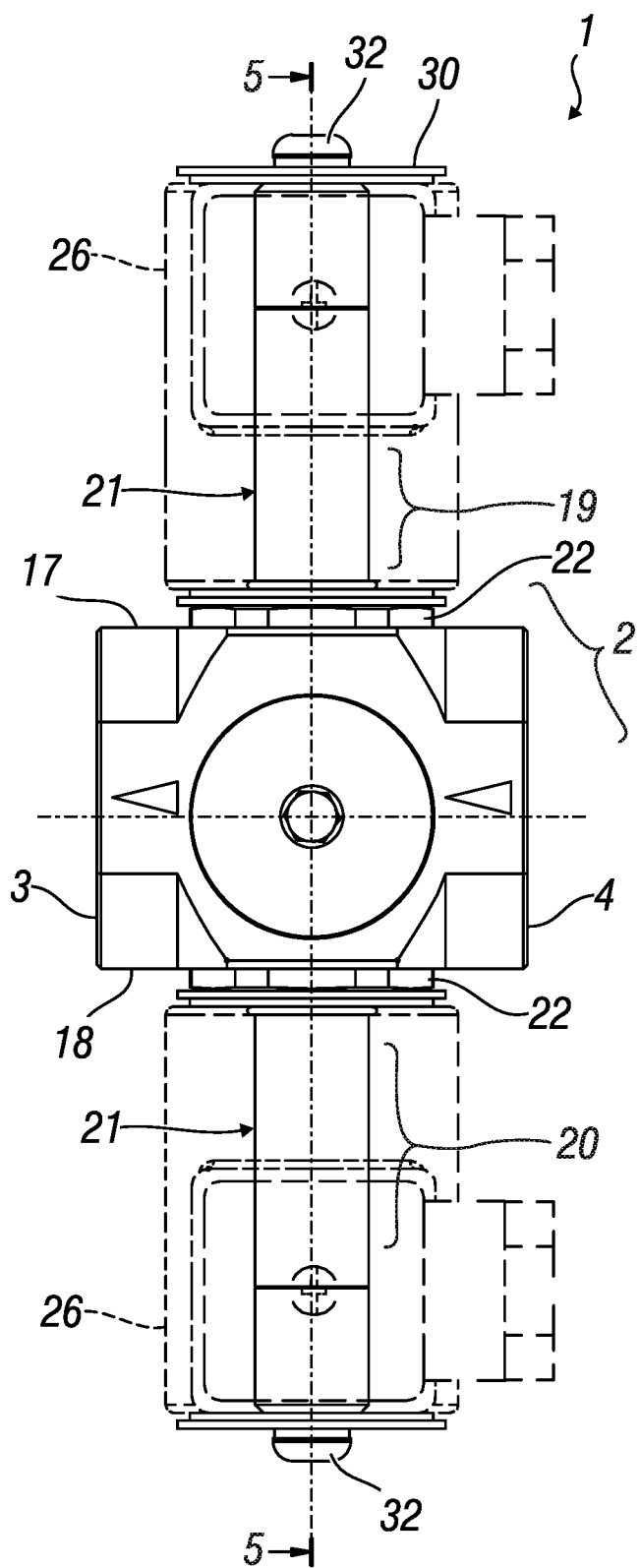
FIG. 3 is a front view of the valve of FIG. 1.
Figure 4:
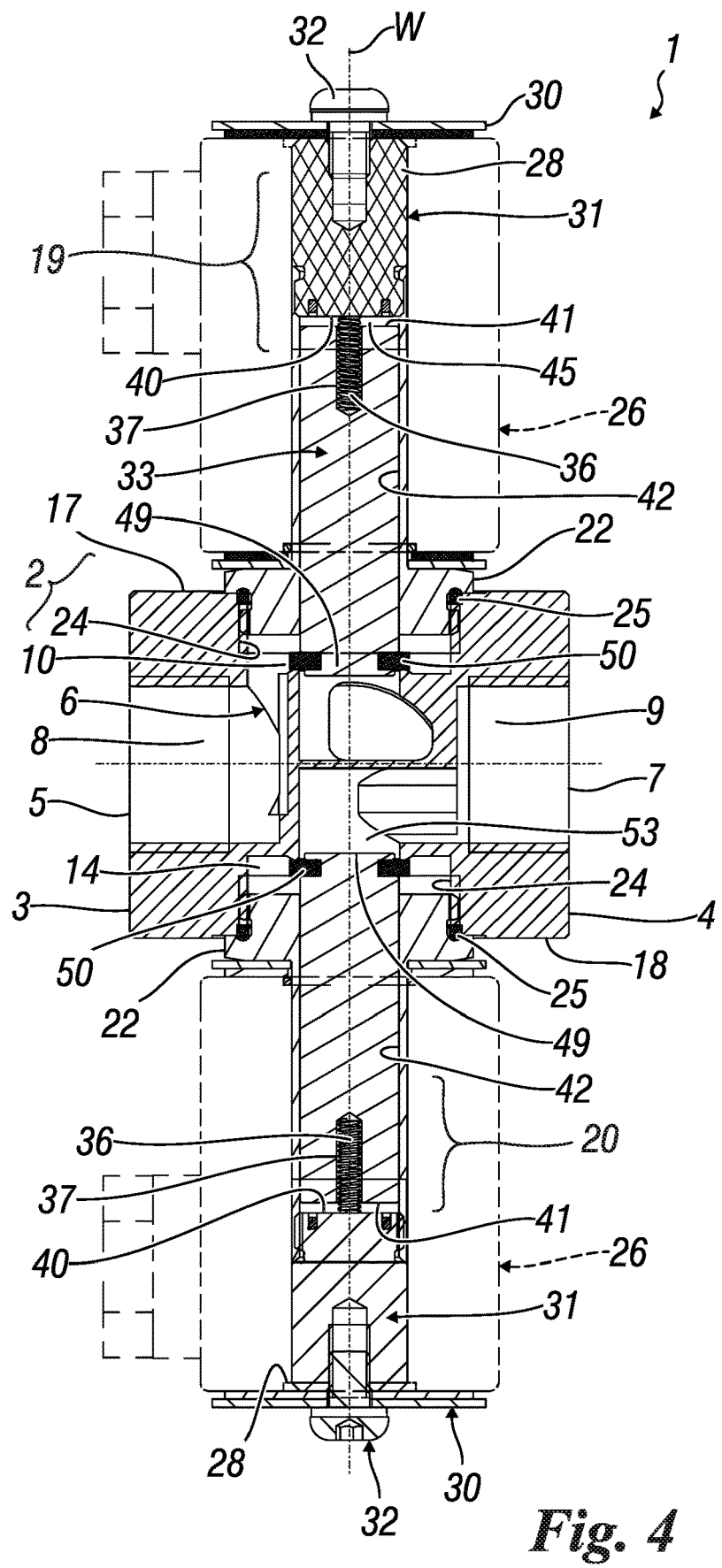
FIG. 4 is a section view along the line 4-4 of FIG. 2.
Figure 5:
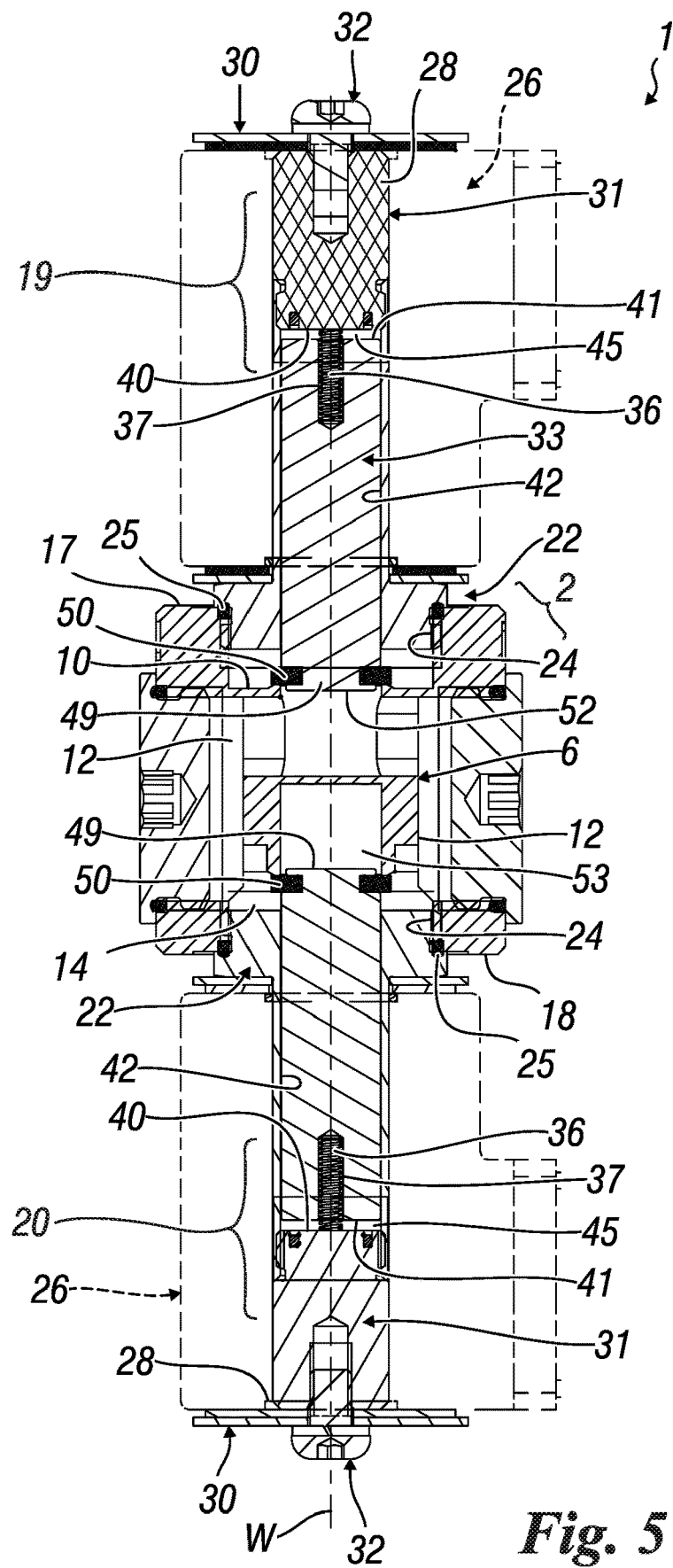
FIG. 5 is a sectional view along the line 5-5 of FIG. 3.
Figure 6:
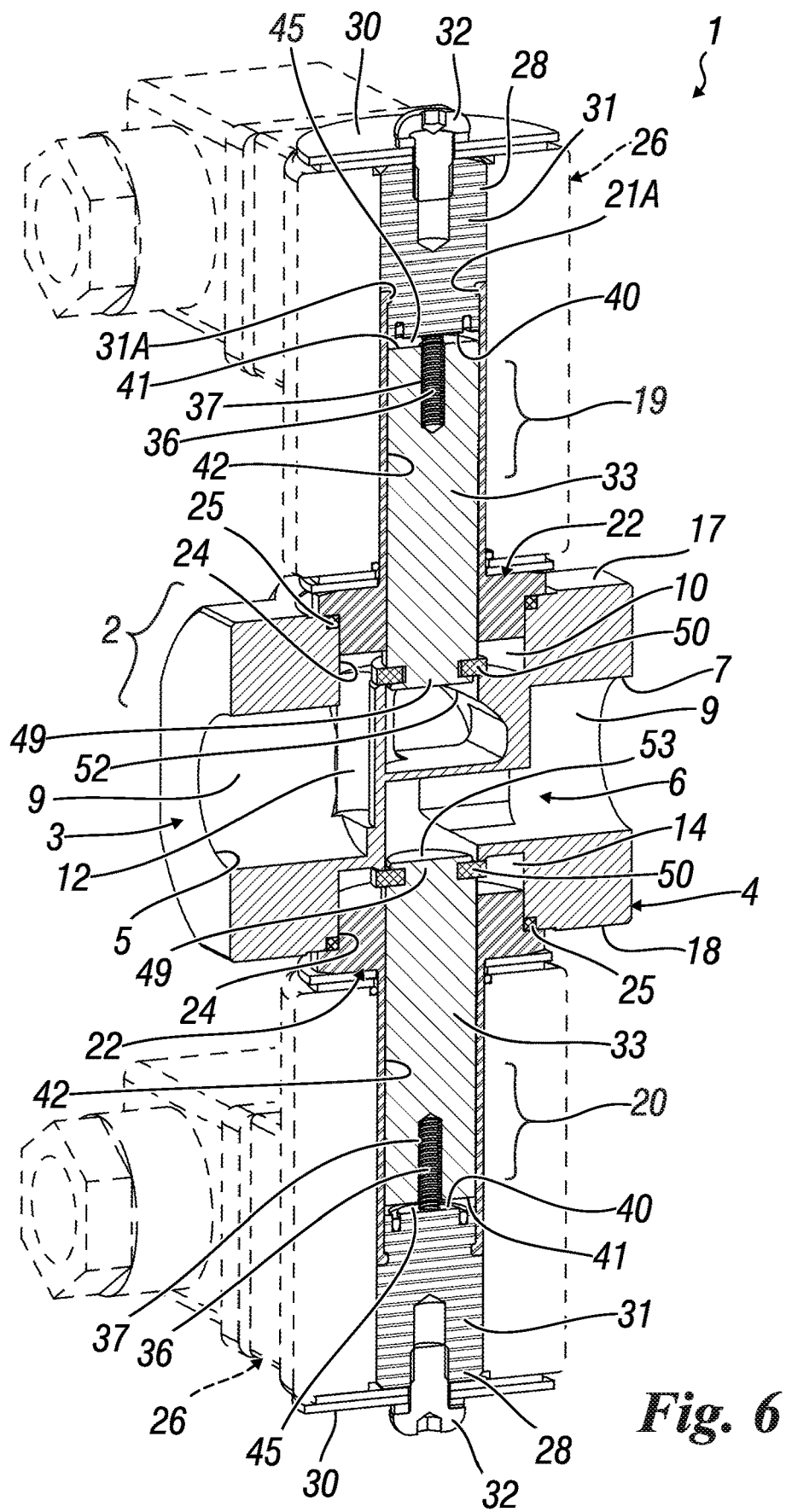
FIG. 6 is a perspective view of the section of FIG. 5.

With reference to the aforementioned figures, a double safety valve is generically indicated with 1. It comprises a valve body 2 having, in the example of the figures, a polyhedron conformation and having, on opposite faces 3 and 4, an inlet opening 5 for a pressurized fluid and an outlet opening 7 for said fluid. The inlet 5 and outlet 7 openings are connected in a per se known manner to a first portion of a duct fed with that fluid, and to a second portion of the duct which transfers that fluid to a user or to another duct.

These inlet 5 and outlet 7 openings are connected to a central portion 6 of the valve body 2 by means of an inlet 8 and an outlet 9 duct; a first chamber 10 (on the top, in the figures), connected to the inlet duct 8, communicates with lateral chambers 12 provided in the aforementioned central portion 6 which in turn are connected to a second chamber 14 (on the bottom, in the figures). This chamber is in turn connected to the outlet duct 9.

Two shutters 19 and 20, each constrained in a per se known manner to the respective faces 17 and 18, are present at other opposite faces 17 and 18 of the valve body 2. In particular, each shutter comprises a hollow tubular portion 21 having an end 22 coupled, by screwing, to a seat or hole 24 provided in the respective face 17 or 18 of the valve body 2. Suitable sealing elements 25 (O-rings) are placed between each end 22 and the valve body 2 at the respective seat 24.

Each hollow tubular portion 21, made of non-magnetic material (for example brass), is inserted into an electric coil or solenoid 26 (shown in broken line in the figures) electrically powered in a known manner. In particular, that coil or solenoid 26 is placed between the end 22 of the hollow tubular portion 21 and a plate 30 placed at a free end 28 of the aforementioned portion 21. Usual sealing and anti-vibration elements (not shown) are placed among each coil 26 and the respective plate 30 and the aforementioned ends 22.

Each hollow tubular portion 21 includes a closing element 31 (placed near the free end 28 of the portion 21) and a movable member 33 made of a ferromagnetic material adapted to move and rest on the central portion 6 of the valve body. A screw 32 secures the plate 30 to said closing element, which closing element is screwed into the hollow tubular portion (by using a sealing material arranged between the threads 31A and 21A of the element 31 and the portion 21).

A compression spring 36 is also included between the movable member 33 and said closing element 31, partially inserted in a seat 37 of the movable member and cooperating with a free end 40 of the closing element facing a first end 41 of the moving member. The latter is placed within the hollow tubular portion 21 with a clearance (that is to say, there is a space 42 between the movable member 33 and said portion) and can move in that portion when the coil 26 is electrically powered.

A chamber (which will be referred to as the "end chamber") 45 is present between the free end 40 of the closing element 31 and the first end 41 of the movable member when the coil 26 is deactivated (not powered).

That end chamber 45 communicates with the aforementioned space 42 which in turn communicates with the first chamber 10 of the central portion 6 of the valve body 2. When the coil is deactivated, each movable member 33 rests with its second end 49 on the central portion 6 closing the connection between the first chamber 10 and the lateral chambers 12 and between the second chamber 14 and the outlet duct 9. The spring 36 acting on the corresponding member 33 pushes the latter against the central portion 6 interrupting the aforementioned communications between the chambers 10, 14 with the lateral chambers 12. A gasket or sealing element (O-ring) 50 is provided on and protruding annularly from the second end 49 of each movable member so as to seal the central position 6 at the passages 52 and 53 which connect the chamber 10 with the lateral chambers 12 and the chamber 14 with the outlet duct 9, respectively.

It should be noted, however, that the fluid entering the valve body 6 from the inlet opening 5, penetrates the inlet duct 8, reaches the chamber 10 and here acts on the gasket or sealing element 50 pushing it towards the central portion 6 of the body valve 2. At the same time, since (as mentioned) the first chamber 10 is in communication with the end chamber 45 through the space 42, the pressurized fluid reaches the end chamber 45 and presses on the first end 41 of the movable member 33 pushing it, along its longitudinal axis W, towards the inside of the valve body 2 or towards the central portion 6.

This helps to interrupt the fluid flow from the inlet port 5 to the outlet port 6.

Therefore, during the use of the valve 1, the activation of the (electrically powered) coils 26 leads to the movement of each movable (ferromagnetic) member 33 along its own axis W (perpendicular to the inlet and outlet direction of the fluid from the valve 1), and then to the detachment of the second end 49 from the central portion 6. The pressurized fluid can then pass from the inlet opening 5 to the inlet duct 8, to the first chamber 10, to the lateral chambers 12, to the second chamber 14 and then to the outlet duct 9 and to the outlet opening 7. The valve is open.

This flow lasts as long as the coils are powered.

Therefore, a controlled fluid flow can be obtained through the valve 1.

If for some reason a coil were to block, the corresponding movable member 33 would move to the central portion 6 of the valve body 2, interrupting the fluid flow through the valve (valve closed position). The fluid itself would keep the moving part in the closing position of the valve for the reasons described above or because the fluid pressure can act upstream on each shutter (or rather on its movable member).

Therefore the valve 1 operates only if the coils 22 are powered (and the valve is open); in the event that at least one of the two coils should block, the valve would close. It should also be noted that the coils 22 are powered independently of each other so that the two shutters 19 can be activated individually in an opposite way and independently of each other, also allowing the possibility of controlling the various ducts, chambers and seals through the closure of one shutter with respect to the other and verifying the possible passage of fluid through the valve.

Furthermore, due to the way it is made, the safety valve is compact and easy to make.

An embodiment of the invention has been described. Still others are possible in the light of the foregoing description remaining within the scope of the invention defined by the following claims.

The invention claimed is:

1. A double safety valve (1) comprising a valve body (2) placed between a first duct portion and a second duct portion, the valve body (2) having an inlet opening (5) for a pressurized fluid and an outlet opening (7) for that fluid, said openings (5,7) communicating through inlet and outlet ducts (8,9) with chambers (10,12,14) provided within said valve body (2) and connected to each other, said connection between the chambers (10,12, 14) and at least the outlet duct (9) being able to be shut-off and being able to be interrupted or kept open by a first and second movable shutter (19, 20), said first and second shutters being placed along a common longitudinal axis (W) and being opposite to each other, the movable shutters (19, 20) being independent of each other and being activated independently of each other by a corresponding electrically powered coil or solenoid (26), said first and second movable shutters (19, 20) shutting off the connection between the chambers (10, 12, 14) and the outlet duct (9) in favour of the fluid flow, that is to say said pressurized fluid acting on said movable shutters so that said shut-off is maintained when the shutters are deactivated and the safety valve (1) is closed, each shutter (19, 20) being inserted inside the coil or solenoid (26) and comprising a movable member (33) having a first end (41) and a second end (42), said second end (42) being adapted to shutoff the connection between the internal chambers (10, 12) of the valve body or between these chambers (14) and the outlet duct (9), the pressurized fluid acting on said first end (41) when the shutter is deactivated and the safety valve is closed, the chambers (10, 12, 14) in which the pressurized fluid moves within the valve body (2) being provided at a central portion (6) of such valve body (2), the inlet duct (8) communicating with a first chamber (10) placed at one end of the central portion (6) of that valve body and in which the second end (42) of the first shutter (19) moves, said first chamber (10) being connected to lateral chambers (12) provided laterally to said central portion (6), said connection being able to be shut-off by the second end (42) of the first shutter (19) when it is deactivated, said lateral chambers (12) being in communication with a second chamber (14) provided at a second end of the central portion (6) opposite the aforementioned first chamber (10), said second chamber (14) being connected to the outlet duct (9), said connection being able to be shut-off by the second end (42) of the second shutter (20) movable in the second chamber (14) when that second shutter is deactivated, characterized in that each shutter (19, 20) comprises a hollow tubular portion (21) having an end (22) fastened to the valve body (2) and containing the movable member (33), a space (42) being provided between said hollow tubular portion (21) and said movable member (33) communicating with one of the first and the second chamber (10, 14) of the valve body (2) and receiving the pressurized fluid therefrom, an end chamber (45) being provided at said first end (41) of the movable member and communicating with that space (42) between said hollow tubular portion (21) and said movable member (33).

2. The safety valve according to claim 1, characterized in that said hollow tubular portion (21) is made of a non-magnetic material, the relative movable member (33) being made of a ferromagnetic material.

3. The safety valve according to claim 2, characterized in that said second end (42) carries a sealing element (50) on which the pressurized fluid acts when the shutter is deactivated and the safety valve is closed.

4. The safety valve according to claim 1, characterized in that said hollow tubular portion (21) has an end closing element (31) placed at a free end (28) of said hollow tubular portion (21), the aforementioned end chamber (45) being present between said end closing element (31) and said movable member (33), between said closing element (31) and said movable member (33) a compression spring (36) being arranged which is partially inserted in a seat (37) of the movable member (33) provided in its first end (41).

5. The safety valve according to claim 1, characterized in that said shutters (19, 20) are placed with the longitudinal axis (W) perpendicular to the axes of the inlet and outlet ducts (8, 9).

* * * * *